United States Patent [19]
Miyazaki et al.

[11] Patent Number: 5,305,049
[45] Date of Patent: Apr. 19, 1994

[54] CAMERA HAVING IN-EXPOSURE ZOOMING MECHANISM

[75] Inventors: Satoshi Miyazaki, Tokyo; Kazuya Tsukamoto, Hachioji; Shinya Takahashi, Kodaira, all of Japan

[73] Assignee: Olympus Optical Co., Ltd., Tokyo, Japan

[21] Appl. No.: 74,981

[22] Filed: Jun. 10, 1993

Related U.S. Application Data

[63] Continuation of Ser. No. 734,132, Jul. 22, 1991, abandoned.

[30] Foreign Application Priority Data

Aug. 17, 1990 [JP] Japan ................................. 2-215893
Mar. 6, 1991 [JP] Japan ................................. 3-039845

[51] Int. Cl.5 .................. G03B 7/00; G03B 7/083; G03B 3/02
[52] U.S. Cl. .................... 354/412; 354/456; 354/195.12
[58] Field of Search ............... 354/412, 400, 195.12, 354/195.1, 410, 456, 413

[56] References Cited

U.S. PATENT DOCUMENTS 4,731,629 3/1988 Aoshima et al. ................. 354/410
4,896,177 1/1990 Kazami et al. ................. 354/195.1

FOREIGN PATENT DOCUMENTS 61-228426 10/1986 Japan .
63-318531 12/1988 Japan .

Primary Examiner—Michael L. Gellner
Assistant Examiner—Jae N. Noh
Attorney, Agent, or Firm—Frishauf, Holtz, Goodman & Woodward

[57] ABSTRACT

A camera having an in-exposure zooming mechanism includes a shutter speed calculation unit for, when an in-exposure zooming mode is set, calculating a shutter speed suitable for the in-exposure zooming mode on the basis of an output from a luminance measurement unit for measuring a luminance of an object. A timer unit outputs a timing signal when the shutter speed elapses. When the timing signal is output, a judgment unit judges whether or not the in-exposure zooming mode is set. A drive control unit drives a motor to change a focal length of a zooming lens when it is determined that the in-exposure zooming mode is set. A shutter closing unit executes a shutter closing operation upon completion of the zooming operation.

32 Claims, 12 Drawing Sheets

CAMERA HAVING IN-EXPOSURE ZOOMING MECHANISM

This application is a continuation of application Ser. No. 07/734,132, filed Jul. 22, 1991 now abandoned.

BACKGROUND OF THE INVENTION

1. Field of the Invention

The present invention relates to a camera having an in-exposure zooming mechanism for driving a zooming lens during exposure of a film.

2. Description of the Related Art

Conventionally, in order to obtain a special photographing effect, an in-exposure zooming photographing operation for performing a zooming operation during exposure of a film using a camera attached with a zooming lens is known. However, since a zooming operation during exposure requires a skill, it is a high-level photographing technique for general photographers.

Published Unexamined Japanese Patent Application No. 61-228426 discloses a technique for zooming a zooming lens by an electric motor to perform an in-exposure zooming photographing operation.

Published Unexamined Japanese Patent Application No. 63-318531 discloses the following technique. That is, when an in-exposure zooming photographing operation is performed in a state wherein a principal object is present with a dark background, a zooming operation is started after the background image is exposed for a predetermined period of time, and the magnification of the principal object is fixed at an emission timing of a flash device, thereby attaining proper exposure.

When a zooming operation is performed after exposure is performed for a predetermined period of time by combining the in-exposure zooming operation and a flash photographing operation, an emission timing of a flash device is preferably closer to the end of exposure as much as possible. When the principal object is a person, he or she may mistake the flash emission timing as the end of a photographing operation, and may move although exposure is still being executed, resulting in an undesired photograph.

A rear-curtain synchro photographing operation described in Published Unexamined Japanese Patent Application No. 63-318531 described above is effective in solving this problem. However, the following problem is left unsolved.

That is, a principal object image cannot have a desired magnification depending on a zooming start timing, and a flash emission timing. More specifically, according to Published Unexamined Japanese Patent Application No. 63-318531 described above, when the rear-curtain synchro photographing operation is combined with the in-exposure zooming operation, since a flash device emits light during a zooming operation, the magnification is unknown until a corresponding photograph is developed.

When a zooming lens causes movement of a focal point during zooming, the principal object image is photographed in an out-of-focus state. More specifically, a zooming operation is started in an in-focus state for the principal object, and when the flash device emits light during zooming, a principal object image is photographed by the light emission in an out-of-focus state since the focal point of the lens is moved during zooming.

SUMMARY OF THE INVENTION

It is, therefore, an object of the present invention to provide a camera having an in-exposure zooming function, which camera starts an in-exposure zooming operation after exposure is performed for a predetermined period of time, and attains proper exposure of a principal object by flash light, wherein an image of the principal object can be photographed at a desired magnification in an in-focus state.

In order to achieve the above object, a camera having an in-exposure zooming apparatus according to the present invention comprises:

a zoom lens barrel capable of varying a focal length of a taking lens a motor for changing the focal length of the taking lens;

luminance measurement means for measuring a luminance of an object;

mode setting means for setting an in-exposure zooming mode;

shutter speed calculation means for, when the in-exposure zooming mode is selected, calculating a shutter speed suitable for the in-exposure zooming mode on the basis of an output from the luminance measurement means;

shutter release means for executing a shutter opening operation in accordance with an operation of a shutter release button;

counter means for outputting a timing signal after an elapse of the calculated shutter speed;

judgment means for, when the timing signal is output, judging whether or not the in-exposure zooming mode is set;

drive control means for, when the judgment means determines that the in-exposure zooming mode is set, driving the motor to change the focal length of the taking lens; and shutter closing means for executing a shutter closing operation upon completion of the zooming operation.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described hereinafter with reference to the accompanying drawings.

Figure 1:
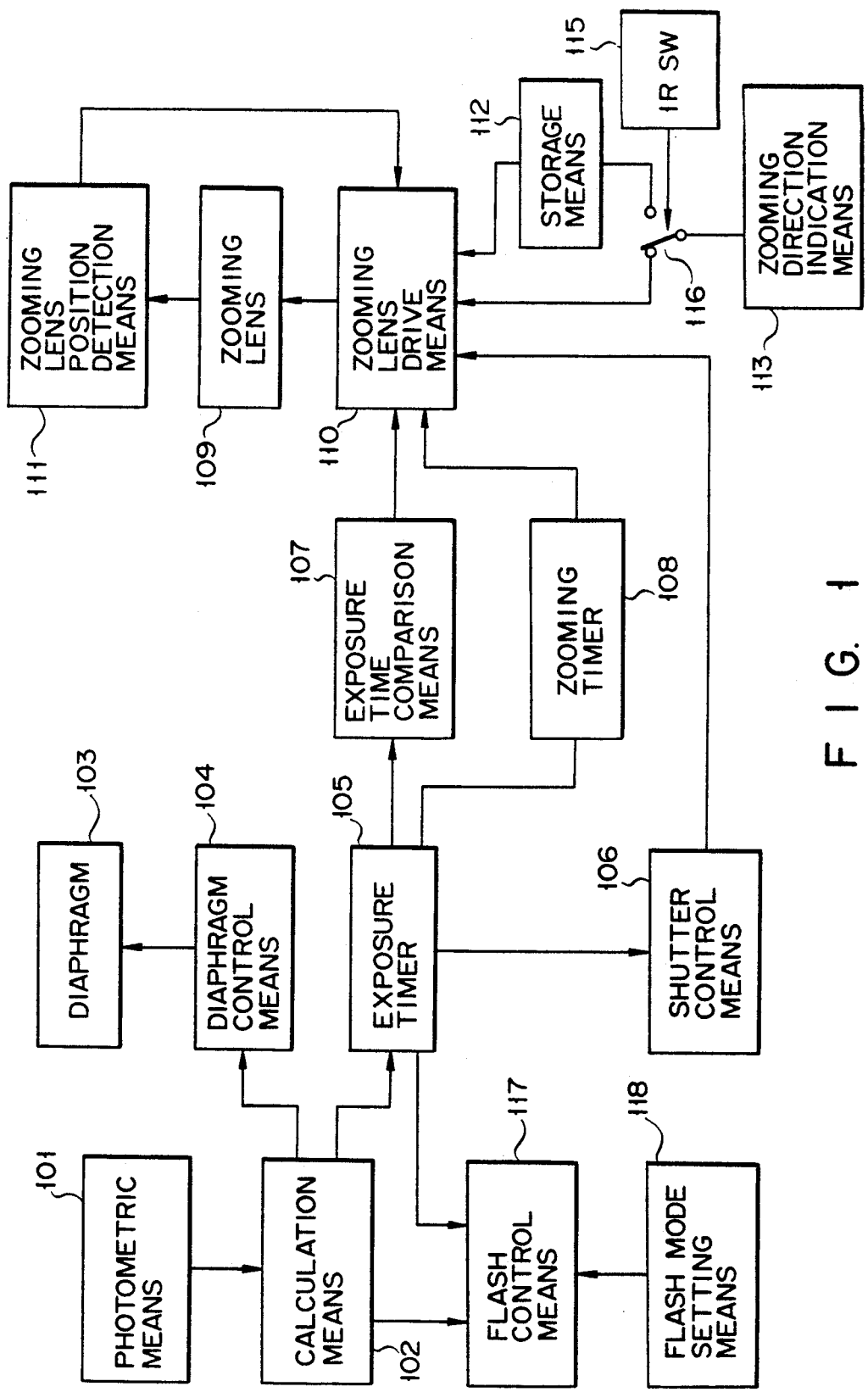
FIG. 1 is a schematic block diagram of an in-exposure zooming apparatus according to the first embodiment of the present invention.

As the first embodiment of the present invention, an arrangement of an in-exposure zooming apparatus used in a camera having the in-exposure zooming apparatus according to the present invention will be explained below. FIG. 1 is a schematic block diagram showing the in-exposure zooming apparatus.

In FIG. 1, reference numeral 101 denotes a photometric means; 102, a calculation means for calculating a light amount based on an output from the photometric means 101; 103, a diaphragm; 104, a diaphragm control means for controlling the diaphragm 103 on the basis of the calculation result of the calculation means 102; 105, an exposure timer for measuring an exposure time; 106, a shutter control means for controlling an opening/closing operation of a shutter; 107, an exposure time comparison means for comparing and judging whether or not an exposure time is a time capable of obtaining an in-exposure zooming photographing effect; 108, a zooming timer for measuring a zooming time; 109, a zooming lens; 110, a zooming lens drive means for driving the zooming lens 109; 111, a zooming lens position detection means for detecting the position of the zooming lens 109; 112, a storage means for storing data for determining a zooming direction when the in-exposure zooming operation is performed; 113, a zooming direction indication means for indicating a zooming direction; 115, a first-stroke switch of a release button (to be referred to as a first release switch hereinafter); and 116, a selection switch for selecting whether an output from the zooming direction indication means is input to the zooming lens drive means 110 or to the storage means 112. Furthermore, reference numeral 117 denotes a flash control means for controlling light emission of a flash device; and 118, a flash mode setting means for designating an emission mode of the flash device.

In this arrangement, when the first release switch 115 is turned on, the selection switch 116 is operated, and the output from the zooming direction indication means 113 is input to the storage means 112. Thus, the output from the means 113 is stored in the storage means 112. The storage data is used for indicating an in-exposure zooming direction. Whether or not in-exposure zooming can be performed is determined by the exposure time comparison means 107 when a predetermined exposure time elapses. If it is determined that the in-exposure zooming can be performed, the drive operation of the zooming lens 109 (zooming operation) is performed by the zooming lens drive means 110; otherwise, the shutter is closed by the shutter control means. Note that the zooming operation is ended when the end portion of the zooming lens is detected by the zooming lens position detection means 111 or when the zooming timer ends a predetermined measurement.

As the second embodiment of the present invention, a camera having the in-exposure zooming apparatus of the present invention will be described below.

Figure 2:
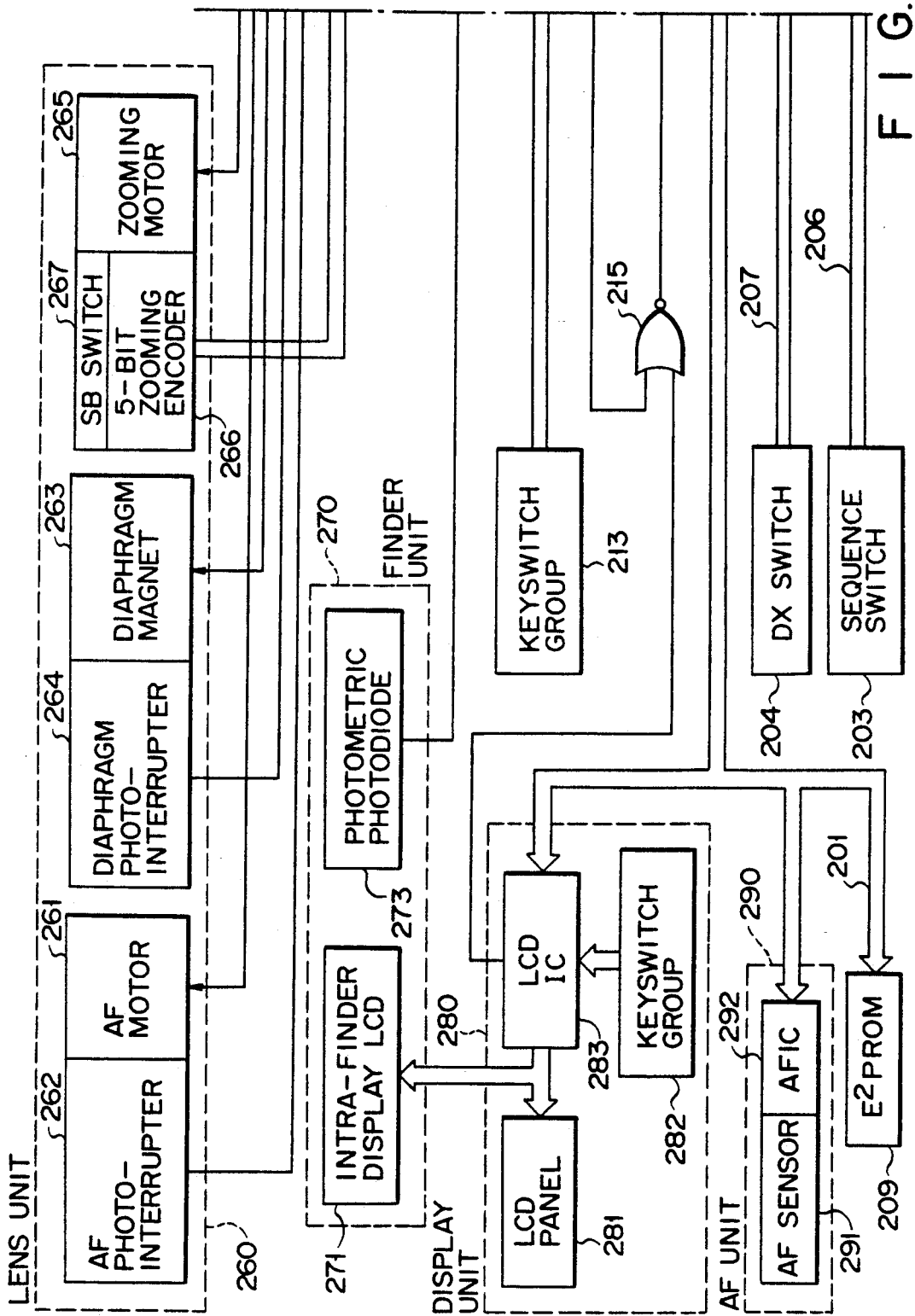
FIG. 2 is a schematic block diagram showing some blocks of a camera system having an in-exposure zooming apparatus according to the second embodiment of the present invention.
Figure 3:
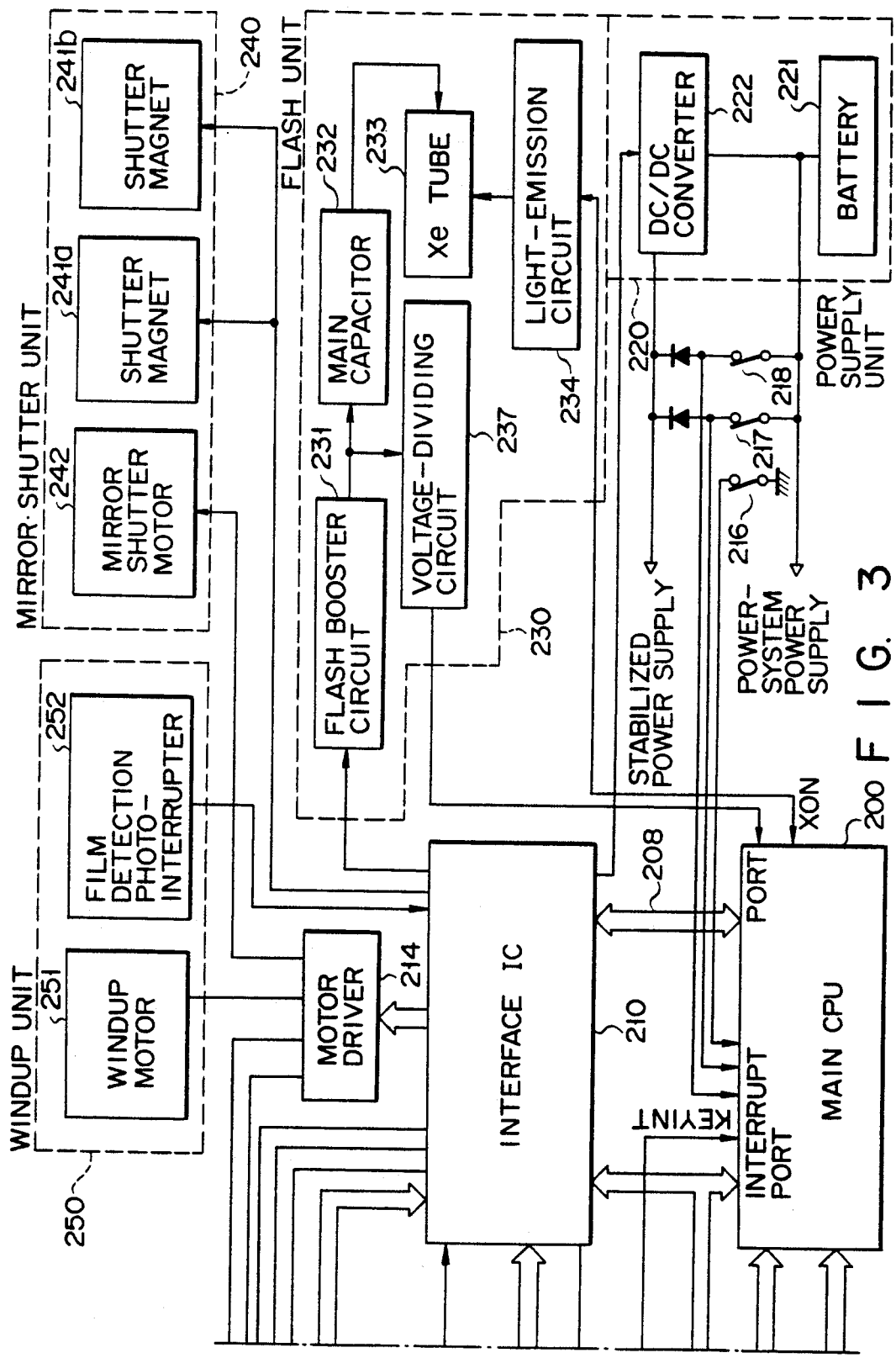
FIG. 3 is a partial schematic block diagram showing the remaining blocks of the camera system having the in-exposure zooming apparatus according to the second embodiment of the present invention.

FIGS. 2 and 3 are schematic block diagrams of the camera system having the in-exposure zooming apparatus according to this embodiment.

As shown in FIGS. 2 and 3, the camera having the in-exposure zooming apparatus of this embodiment can be roughly classified into 10 blocks, i.e., a main CPU 200, an interface IC 210, a power supply unit 220, a flash unit 230, a mirror-shutter unit 240, a film windup unit 250, a lens unit 260, a finder unit 270, a display unit 280, and an AF unit 290.

The respective blocks will be described in detail below.

The main CPU 200 controls the overall camera, and exchanges data with the interface IC 210, an LCDIC 283, an AFIC 292, and an E²PROM 209 via a serial communication line 201. A special-purpose data line 208 is arranged between the main CPU 200 and the interface IC 210, and is used to exchange data such as a power supply voltage, an analog signal of a photometric output, a waveshaped signal from a photointerrupter, and the like, which cannot be supplied in serial communications. An analog signal is input to an A/D conversion port of the main CPU 200, and is converted into digital data in the main CPU 200. Similarly, a flash charging voltage voltage-divided by a voltage-dividing circuit 237 (to be described later) is also input to an A/D port of the main CPU 200. In the main CPU 200, four interrupt ports are prepared, and are respectively connected to a PW switch 217, a BK switch 218, a PUP switch 216, and a KEYINT line, as will be described later. Other input/output (I/O) ports are normal I/O ports. With these ports, the main CPU 200 directly reads states of a DX switch 204 for reading DX data of a patrone, and a sequence switch 203 such as an X switch for detecting whether or not a travel operation of a front curtain of the shutter is completed.

The interface IC 210 is constituted by an analog processing unit such as drive circuits for motors (a mirror-shutter motor 242, a windup motor 251, a zooming motor 265, and an AF motor 261), and for magnets (shutter magnets 241a and 241b, and a diaphragm magnet 263), a control circuit for a charge signal to be output to a flash booster circuit 231, an ON signal to be output to a DC/DC converter 222, and the like, a photometric circuit for logarithmically compressing an output from a photometric photodiode 273, a waveshaping circuit for photointerrupters (an AF photointerrupter 262, a diaphragm photointerrupter 264, and a film detection photointerrupter 252), and the like, and a digital unit for performing switch input operations, serial communications, and data latch operations.

Since the drive operations of the motors require a large current, a motor driver 214 is arranged outside the interface IC 210.

The key switch group 213 includes a first release switch, a second release switch, a ZOOM-TELE switch, a ZOOM-WIDE switch, a SHIFT-UP switch, a SHIFT-DOWN switch, a SELF switch, and a SPOT switch. The states of these switches are read by the main CPU 200 in serial communications. The key switch group 213 also includes a 5-bit zooming encoder, and an SB switch for detecting a collapsed position of a lens barrel, and their states are similarly read by the main CPU 200 in serial communications.

The power supply unit 220 supplies two systems of power supply voltages. One power supply voltage is used for drivers for the motors, magnets, and the like, which require high power, and a battery voltage is always supplied. The other power supply voltage is a one for small signals, which is stabilized by the DC/DC converter 222, and is controlled by the interface IC 210.

The flash unit 230 comprises a main capacitor 232, the flash booster circuit 231 for charging the main capacitor 232, the voltage-dividing circuit 237 for dividing a voltage of the main capacitor so as to be monitored by the main CPU 200, an Xe tube 233, and a light-emission circuit 234 for causing the Xe tube 233 to emit light. The flash booster circuit 231 is controlled by a signal from the interface IC 210. The main CPU 200 instructs the interface IC 210 to execute or stop charging on the basis of the output from the voltage-dividing circuit 237. The Xe tube 233 emits light in response to an X-ON signal from the main CPU 200.

The mirror-shutter unit 240 comprises the mirror-shutter motor 242 for performing mirror up/down operations, and a shutter charging operation upon its forward rotation, and the two shutter magnets 241a and 241b for controlling traveling of the front and rear curtains of the shutter.

The X switch (not shown) is a switch for signaling a full open state of a focal plane shutter, and is used for obtaining an emission timing of the flash device. The reverse rotation of the mirror-shutter motor 242 is transmitted to a patrone chamber through a gear train, and is used to rewind a film.

The film windup unit 250 comprises the windup motor 251, and the film detection photointerrupter 252. The film is wound up by the forward rotation of the windup motor 251.

The lens unit 260 comprises the AF motor 261 used when focusing is performed, the AF photointerrupter 262 for generating feedback pulses, the diaphragm magnet 263 for stopping a stop-down operation, the diaphragm photointerrupter 264 for detecting a stop-down amount, the zooming motor 265 for performing a zooming operation, a 5-bit zooming encoder 266 for detecting an absolute position of the zooming lens, and an SB switch 267 for detecting a collapsed position of the zooming lens. The lens unit 260 controls the diaphragm of the lens. The AF motor 261 is driven by an amount according to a defocusing amount measured by the AFIC 292. The drive amount of the AF motor 261 is detected as the number of feedback pulses from the AF photointerrupter 262. The absolute distance to an object required for controlling the G number of the flash device is obtained by accumulating the number of pulses from the AF photointerrupter 262 after the lens is reset to its infinity position. The zooming motor 265 is used for zooming the lens (not shown), and for collapsing the lens when the lens is not used. The motor 265 is controlled by the zooming encoder 266 and the SB switch 267 in correspondence with the absolute position of the lens. The zooming encoder 266 supplies absolute position data to the main CPU 200 via the interface IC 210. The SB switch 267 is arranged at the collapsing end of the lens, and detects completion of the collapsing operation. The release point of the collapsing position is common to the WIDE end of the zooming encoder 266. A diaphragm (not shown) mechanically performs a stop-down operation by a spring simultaneously with the mirror-up operation, and when a set aperture value is reached, magnetic attraction of the diaphragm magnet 263 is released, thus stopping the diaphragm at a desired position. The stop-down amount is detected by detecting rotation of a gear interlocked with a stop-down operation of aperture blades by the diaphragm photointerrupter 264.

The finder unit 270 is an optical system for guiding an object image reflected by a reflex mirror (not shown) and formed on a Fresnel lens toward an eyepiece section. An electrical system arranged in the finder unit 270 includes an intra-finder display LCD 271 for performing a display in the finder, and the photometric photodiode 273. A photocurrent generated by the photometric photodiode 273 is directly supplied to the interface IC 210, and is current/voltage-converted by the interface IC 210. The converted voltage is supplied to the A/D port of the main CPU 200.

The display unit 280 is arranged in the back cover of the camera. In the display unit 280, an LCD panel 281, a key switch group 282 arranged on a back cover portion, and the LCDIC 283 for driving the LCD panel 281, and reading states of the key switch group 282 are arranged. As the key switch group 282, a MODE switch, a ± switch, a PF switch, a Z-MEMO switch, a MACRO switch, a REWIND switch, a DRIVE switch, a SUBJECT switch, and a FLASH switch are connected. ON/OFF states of these switches are read by the main CPU 200 via the LCDIC 283. The AF unit 290 comprises an AF sensor 291, and the AFIC 292. The E$^2$PROM 209 is used as a means for storing data to be left after the power supply is turned off, of those stored in an internal RAM of the main CPU 200.

The PW switch 217 is a power switch of the camera. When the PW switch 217 is turned on, a voltage from a battery 221 is supplied to a stabilized power supply as a power supply for the main CPU 200, and the main CPU 200 is power-on reset. Thus, an operation is started from the beginning of a program to prepare for a photographing operation. The BK switch 218 is a switch interlocked with the back cover, and when the back cover is opened, a power supply voltage is supplied to the main CPU 200 in the same manner as the PW switch 217. This is to load a film when the back cover is closed even when the PW switch 217 is kept OFF. For this reason, even when only the BK switch 218 is turned on, a preparation for a photographing operation is not performed. When the main CPU 200 starts an operation, the DC/DC converter 222 is started via the interface IC 210, and a power supply voltage can be kept supplied to the main CPU 200 after the PW switch 217 and the BK switch 218 are turned off. In this case, the main CPU 200 performs processing (collapsing, saving of data to the E$^2$PROM 209, and the like) which must be performed before a power-OFF operation, and then stops the DC/DC converter 222. The PUP switch 216 is a switch for detecting a pop-up state of the flash device, and permitting charging and light-emission operations of the flash device. The KEYINT line supplies an output signal from the NOR gate 215, which signal is obtained by NORing a signal input when one of switches in the first key switch group 282 connected to the LCDIC 283 is depressed, and an output signal from the interface IC 210.

Operations of the camera system having the in-exposure zooming apparatus shown in FIGS. 2 and 3 will be described hereinafter.

Figure 4:
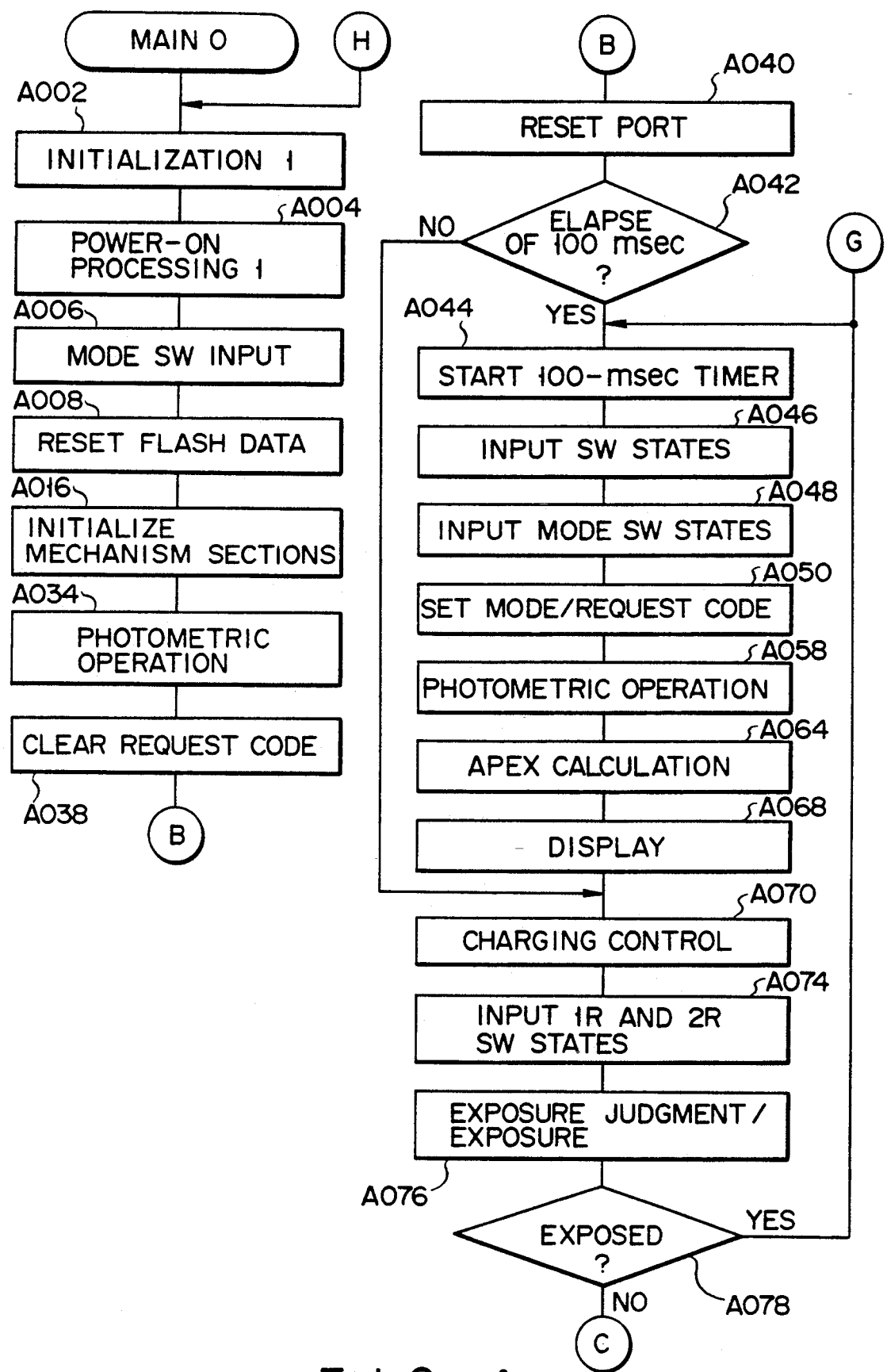
FIG. 4 is a schematic flow chart showing some steps of an operation of a main CPU shown in FIGS. 2 and 3.
Figure 5:
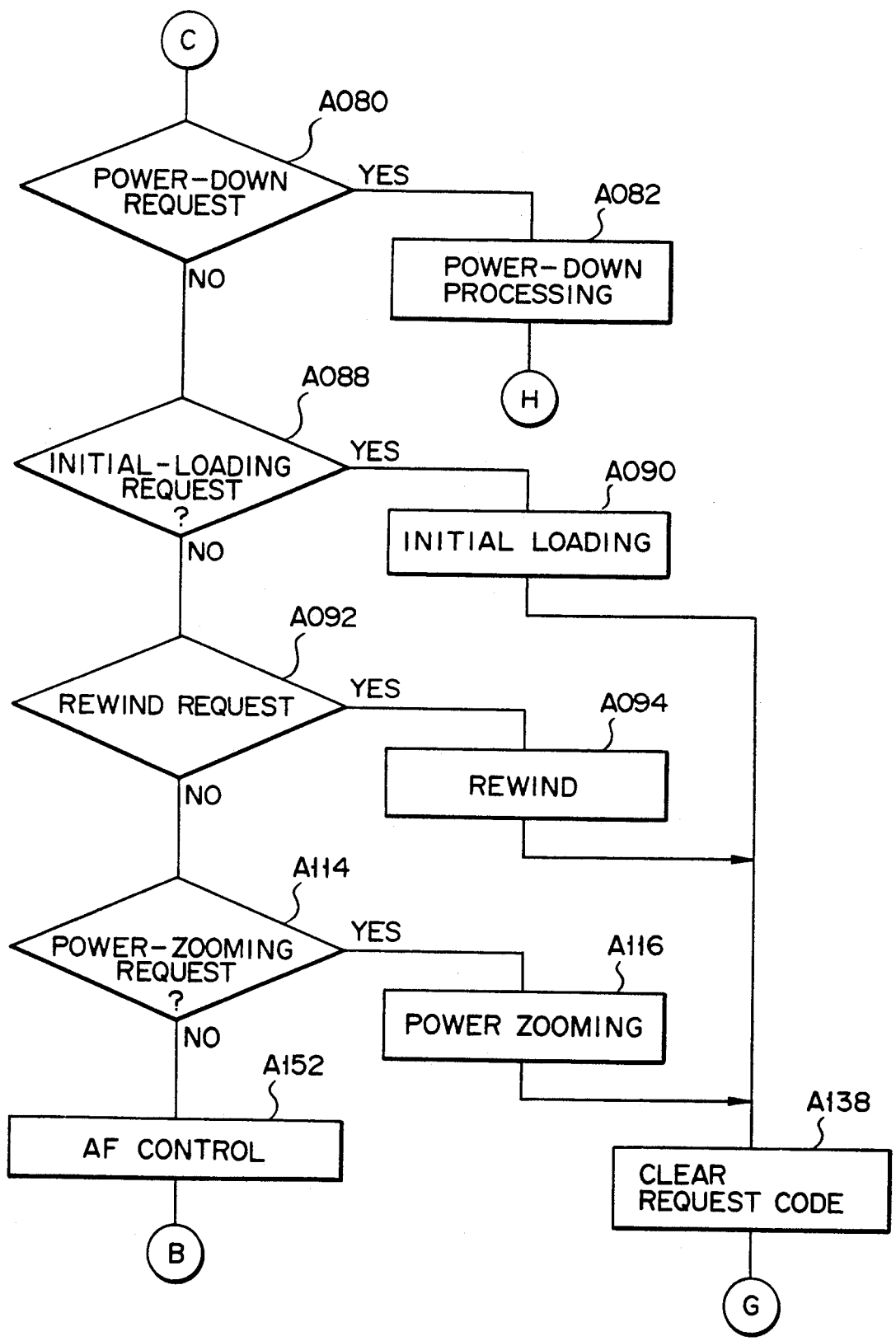
FIG. 5 is a schematic flow chart showing remaining steps of the operation of the main CPU shown in FIGS. 2 and 3.
Figure 6:
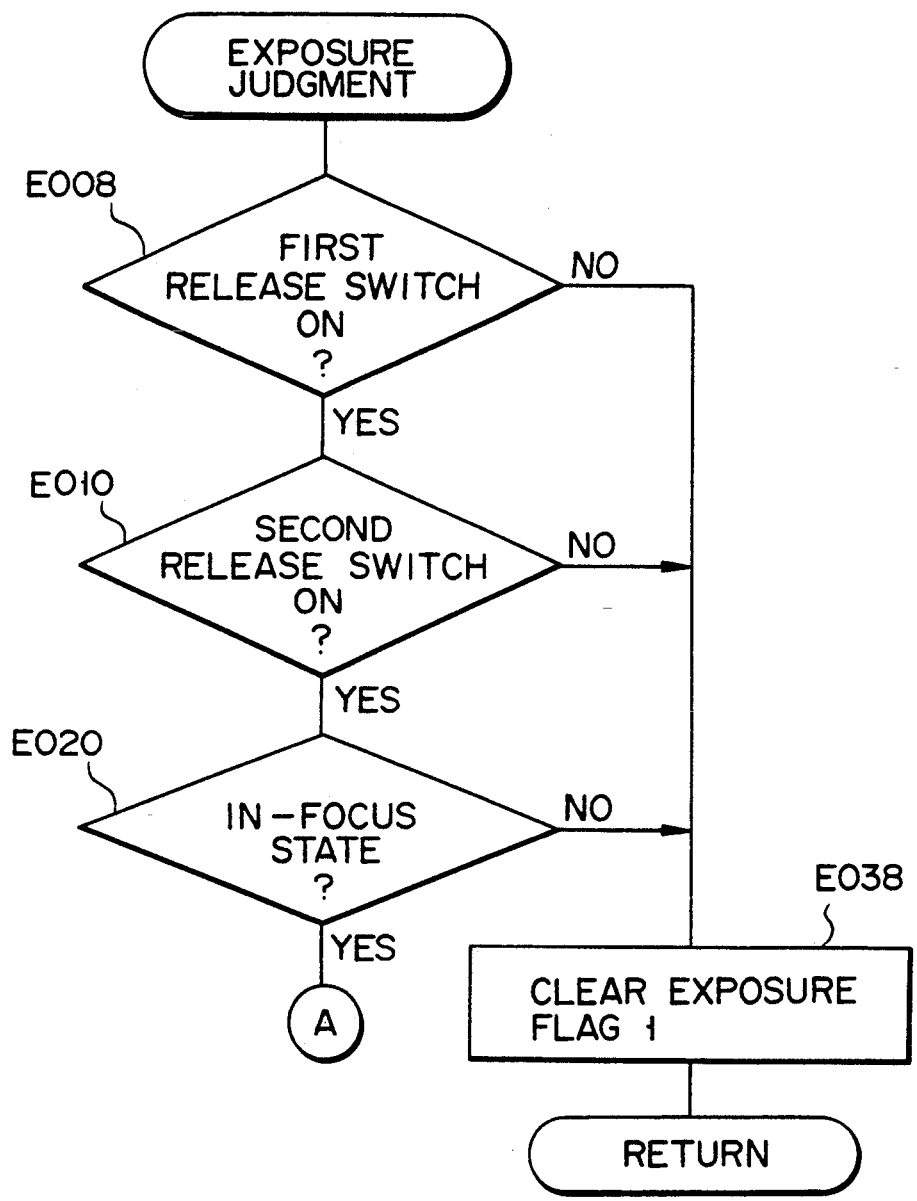
FIG. 6 is a flow chart for explaining some steps of an exposure judgment/exposure subroutine shown in FIG. 4.
Figure 7:
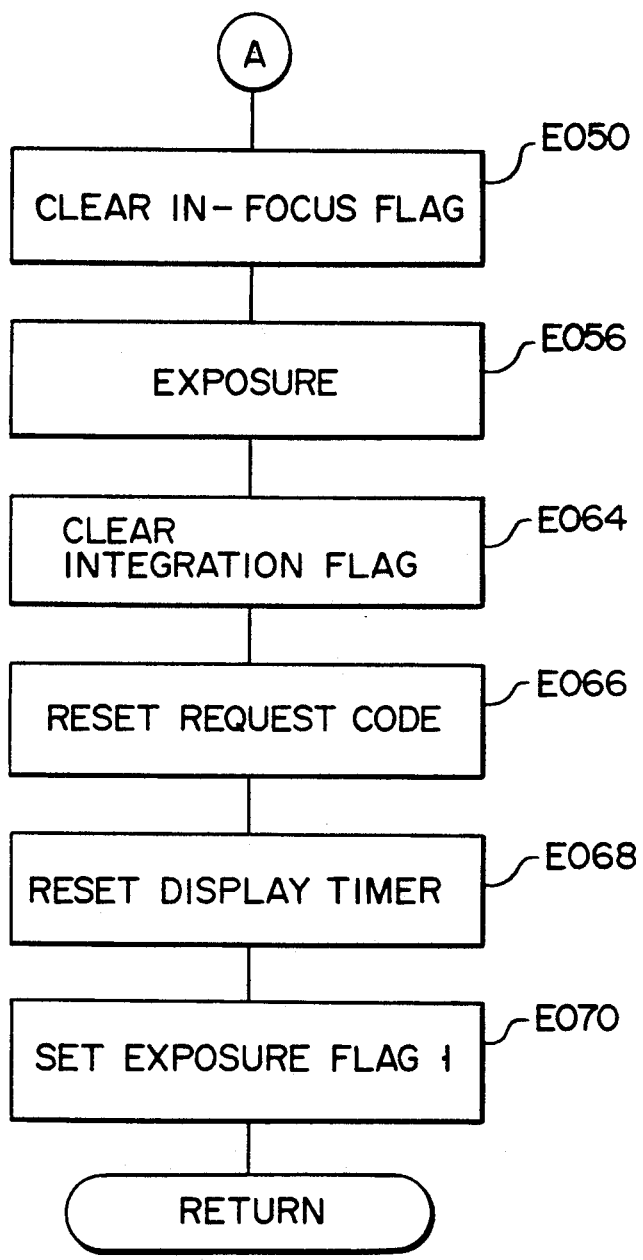
FIG. 7 is a flow chart for explaining the remaining steps of the exposure judgment/exposure subroutine shown in FIG. 4.

FIGS. 4 and 5 are schematic flow charts (main routine) showing operations of the main CPU 200.

When a photographer turns on the PW switch 217 to perform a photographing operation, or opens the back cover to load a film, the BK switch 218 is turned on, and the main CPU 200 is started. When the main CPU 200 is started, a program is executed according to the flow charts shown in FIGS. 4 and 5.

In step A002, processing for setting a stack, and disabling an interrupt mode is executed.

In step A004, power-ON initialization processing is executed. In this initialization processing, the interface IC 210 is started, the DC/DC converter 222 is started via a communication to the interface IC 210, data are read from the E$^2$PROM 209, the internal RAM (random-access memory) of the main CPU 200 is initialized, the I/O ports of the main CPU 200 are initialized, and so on.

In step A006, a mode switch input subroutine is executed. In the mode switch input subroutine, the states of switches (the key switch groups 213 and 282) connected to the LCDIC 283 and the interface IC 210 are read by the main CPU 200 via a serial communication, and are compared with the previous data, thus detecting edges. This subroutine aims at inputting switch initial states immediately after a power-ON operation.

In step A008, processing for resetting data of, e.g., a charging state of the flash device is executed.

In step A016, mechanism sections of the camera are initialized to prepare for an exposure operation.

In step A034, a photometric subroutine is executed. In this subroutine, an initial photometric value is input.

In step A038, a request code is reset. When the flow is required to branch from the main routine according to various data, a request code corresponding to the required branch operation is set. The request code is 1-byte data, and when it is 00H, no branch operation is performed, and a main loop is repeated.

A section corresponding to the main loop will now be described. The main loop can be roughly classified into two loops. The first loop consists of step A040, and steps A070 to A152, and is always executed. When a 100-msec timer overflows, the second loop consisting of steps A040 to A068 is executed. The respective processing operations in the main loop will be described below.

In step A040, the I/O ports of the main CPU 200 are refreshed.

In step A042, it is checked if the 100-msec timer overflows. If it is determined that the timer overflows, the 100-msec timer is restarted in step A044.

In step A046, the states of the PW switch 217, the BK switch 218, and the PUP switch 216 for detecting a ready/storage state of the built-in flash device are input to the main CPU 200, and are compared with the previous data, thereby detecting OFF→ON/ON→OFF edges.

In step A048, the same mode switch input subroutine as in step A006 described above is executed.

In step A050, a mode/request code setting subroutine is executed. In this subroutine, a branch request code from the main routine is set, and operation modes and data of the camera are set or changed in accordance with the states of the switches input in steps A046 and A048.

Figure 11:
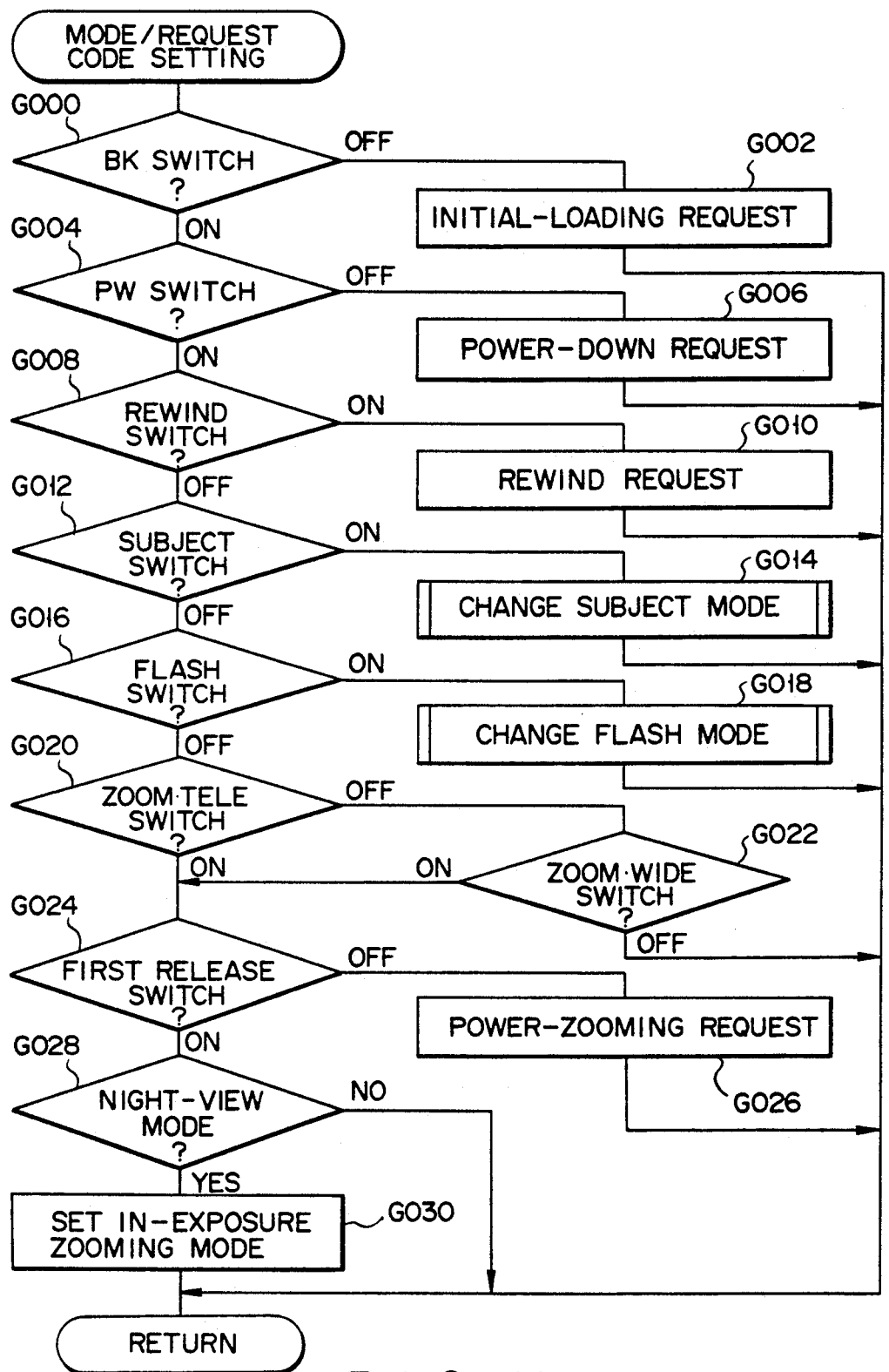
FIG. 11 is a flow chart for explaining a mode/request code setting subroutine shown in FIG. 4.

This subroutine will be described in detail below with reference to FIG. 11.

In this subroutine, mode data is changed, or a request code is set on the basis of the states of the switches or data of a change in state input in steps A046 and A048.

In step G000, it is checked if the BK switch is changed from an ON state to an OFF state. More specifically, it is checked if the back cover of the camera is closed, and according to the checking result, an initial-loading request code is set in step G002.

In step G004, it is checked if the PW switch is ON. If it is determined that the PW switch is ON, a power-down request code is set in step G006. In step G008, it is checked if the REWIND switch is ON. If it is determined that the REWIND switch is ON, a rewind request code is set in step G010. In step G012, it is checked if the SUBJECT switch is ON. If it is determined that the SUBJECT switch is ON, subject mode data is changed in step G014. In the subject mode, decision-free modes such as a night-view photographing mode capable of performing an in-exposure zooming operation of the present invention, a portrait mode for taking a good photograph of a person, and the like are prepared. When a user wants to perform an in-exposure zooming photographing operation, he or she must depress the SUBJECT switch to select the night-view photographing mode. It is checked in step G016 if the FLASH switch is ON. If it is determined that the FLASH switch is ON, flash mode data is changed in step G018. During exposure, front-curtain synchro light emission, rear-curtain synchro light emission, and the like are controlled using this data.

In steps G020 and G022 it is checked if the ZOOM switch is ON. If it is determined that the ZOOM switch is ON, it is then checked in step G024 if the first release switch is ON. If it is determined that the first release switch is OFF, a power-zooming request code is set; otherwise, it is checked in step G028 if the night-view mode is selected. If it is determined that the night-view mode is selected, an in-exposure zooming flag is set. The in-exposure zooming operation is executed based on this flag during exposure. As for the zooming direction, since the states of the ZOOM-TELE switch and the ZOOM-WIDE switch are stored in the RAM in the main CPU in step A048, the ZOOM switch need not be kept depressed during exposure.

In step A058, a photometric subroutine is executed. When a command is transmitted to the interface IC 210, a voltage proportional to a log value of a photocurrent from the photodiode based on light reflected by an object, which light is incident through the lens, is output. The voltage is A/D-converted by the main CPU 200, thereby calculating the luminance (BV (brightness value) value) of the object.

Figure 12:
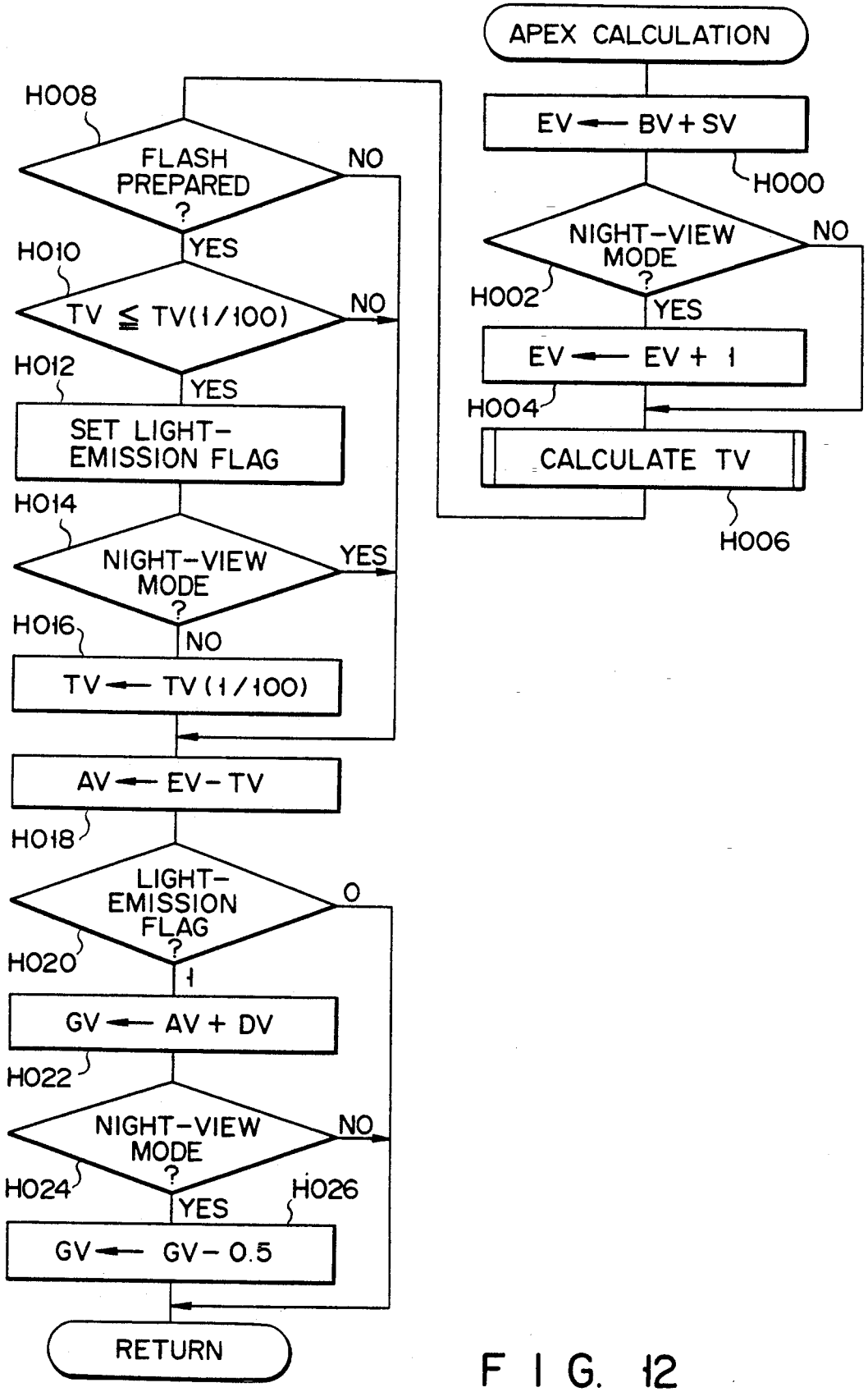
FIG. 12 is an APEX calculation flow chart.

In step A064, an APEX calculation subroutine is executed. In this subroutine, an f-number, a shutter speed, a G number of the flash device, and the like are calculated on the basis of luminance data of an object calculated in step A058, mode data set in step A050, and data of the flash device. This subroutine will be described below with reference to FIG. 12.

As is well known, the relationship among exposure parameters is expressed by $BV+SV=EV=TV+AV$. Using this relationship, a sum of a parameter (brightness value BV) representing the luminance calculated in step A058, and a parameter (sensitiveness value SV) representing a film sensitiveness obtained based on the state of the DX switch is distributed to a parameter (time value TV) representing an exposure time, and a parameter (aperture value AV) representing an aperture diameter.

In steps H000 to H004, an exposure value (EV), i.e., BV+SV is calculated. The reason why "1" is added to EV in step H004 when the night-view mode is selected is to execute processing for correcting an exposure amount by −1 step. More specifically, since a photograph taken in the night-view mode has an exposure amount ½ a normal amount, a night view can be satisfactorily photographed. When the in-exposure zooming operation (to be described later) is performed, a total exposure amount will not become excessive. In step H006, TV is calculated. TV for EV is predetermined.

It is checked in step H008 if the flash device is ready to emit light. More specifically, when the PUP switch is ON, and the charging operation is completed, the flow advances to step H010; otherwise, the flow jumps to step H018. If it is determined in step H010 that a shutter speed corresponding to TV calculated in step H006 is lower than a flash synchronization speed (1/100 sec in this embodiment), an emission flag is set in step H012 to set a flash photographing mode. In this case, the shutter speed is fixed at the flash synchronization speed. However, when the night-view mode is selected, the shutter speed is not fixed at the synchronization speed, and a so-called "slow-synchro" photographing mode is set. In step H018, AV is calculated by AV=EV−TV using the determined TV. In this manner, the shutter speed, and the aperture f-number for exposure are calculated. When a flash photographing operation is performed, an emission amount of the flash device is calculated. As is known, a proper emission amount is determined by (guide number)=(f-number)×(distance). In step H022, the emission amount is calculated according to this relationship. In order to facilitate a calculation by the main CPU, a guide number value GV=AV+distance value DV (for GV=2 log$_2$(guide number), and DV=2 log$_2$(distance)) is used. When TV and AV are calculated in the former steps, an under correction is performed when the night-view mode is selected. As for the flash emission amount, according to this principle, an under correction of −0.5 EV is performed in step H026 when the night-view mode is selected.

In step A068, display data of modes, photometric data, and the like are decoded, and the decoded data are sent to the LCDIC 283 through the serial communication line 201, thereby updating a display of the LCDIC 283.

The second loop has been described. The second loop is executed every 100 msec. Since basic operations of the camera are executed in the second loop executed every 100 msec, setup data of modes, photometric data, displays, and the like are updated every 100 msec.

The first loop processing which is always executed regardless of the 100-msec timer will be described below.

In step A070, a charging control subroutine is executed. In this subroutine, the charging operation of the built-in flash device is controlled. When it is detected that the PUP switch 216 is ON, a start command of the flash booster circuit 231 is transmitted to the interface IC 210, and the flash booster circuit 231 starts charging. The voltage of the capacitor is input from the voltage-dividing circuit 237 to the A/D conversion port of the main CPU 200. When the voltage of the capacitor reaches a predetermined voltage, the main CPU 200 sets a charging end flag, and the flash booster circuit 231 stops charging according to this flag.

In step A074, the states of the first- and second-stroke switches (first and second release switches) of the release switch are input.

In step A076, an exposure judgment/exposure subroutine is executed. In this subroutine, judgment of branch processing to an exposure sequence, and exposure are executed, as will be described later.

In step A078, it is checked if the exposure is executed in step A076. If it is determined that the exposure is executed, the flow jumps to step A044; otherwise, processing in step A080 and subsequent steps is executed.

In steps A080 to A116, various processing operations are executed in accordance with a branch request code detected in step A050.

In step A080, it is checked if a power-down request is set in step A050. If it is determined that the power-down request is set, power-down processing is executed in step A082. If the PW switch 217 or the BK switch 218 is turned on in this state, the flow jumps to step A002, and execution of the program is restarted.

If it is determined in step A080 that no power-down request is set, processing in step A088 is executed. It is checked in step A088 if an initial-loading request is set in step A050. If it is determined that the initial-loading request is set, initial-loading processing is executed in step A090. In the initial-loading processing, when a photographer sets a new film, the film is wound up to a photographable position. When the film is fed to a predetermined position, the flow jumps to step A138.

If it is determined in step A088 that no initial-loading request is set, processing in step A092 is executed. In step A092, it is checked if a rewind request is set in step A050. If it is determined that the rewind request is set, a rewind operation is executed in step A094. In the rewind operation, a photographed film (or a film which is photographed up to an intermediate position of the roll) is rewound into a patrone.

Thereafter, the request command is reset in step A138, and the flow jumps to step A044 described above.

In step A114, it is checked if a power-zooming request is set in step A050. If it is determined that the power-zooming request is set, power-zooming processing is performed in step A116. In the power-zooming processing, the ZOOM-TELE switch and the ZOOM-WIDE switch are monitored, and the zooming motor 265 is rotated in the operated direction of the switch. When the ZOOM-TELE switch or the ZOOM-WIDE switch is turned off, or when the zooming lens reaches the TELE or WIDE end, the zooming motor 265 is stopped. Thereafter, in step A138, the request code is cleared, and the flow jumps to step A044.

If it is determined in step A114 that no power-zooming request is set, processing in step A152 is executed. In step A152, an AF control subroutine is executed. In the AF control subroutine, an integration of the AF sensor is started for a distance measurement, and an AF distance measurement calculation is performed. When the first release switch is ON, the lens is driven for focusing. Subsequently, when focusing is possible, an in-focus flag is set; when focusing is impossible, a focusing disable flag is set. With these flags, whether or not exposure is started is determined, and an in-focus/focusing disable display in step A068 is made. In addition, distance data used for calculating the emission amount of the flash device is also calculated in this subroutine.

The exposure judgment/exposure subroutine in step A076 in the main routine (FIG. 4) will be described below with reference to FIGS. 6 to 9.

In this subroutine, as described above, a judgment for a branch operation to an exposure sequence, and an exposure operation are performed. An exposure flag 1 is a judgment flag used in the main routine and is used in step A078 in FIG. 4. The exposure flag 1 is set to be "1" when exposure is performed, and is set to be "0" when no exposure is performed.

In step E008, the ON/OFF state of the first release switch is checked. If it is determined that the first release switch is ON, the ON/OFF state of the second release switch is checked in step E010. In this case, if it is determined that one of the first and second release switches is OFF, the flow jumps to step E038. However, if it is determined that both the release switches are ON, step E020 is executed.

In step E020, it is checked if an in-focus state is attained. Whether or not the in-focus state is attained is determined based on the in-focus flag. When AF processing is ended in step A152, the in-focus flag is set; otherwise, it is cleared. If it is determined that the in-focus state is not attained, the flow jumps to step E038. On the other hand, if it is determined that the in-focus state is attained, the in-focus flag is cleared in step E050.

In step E056, an exposure subroutine is executed to perform exposure. After completion of the exposure, the respective flags are set/reset (steps E064 to E070), and the flow returns to the main routine.

Figure 8:
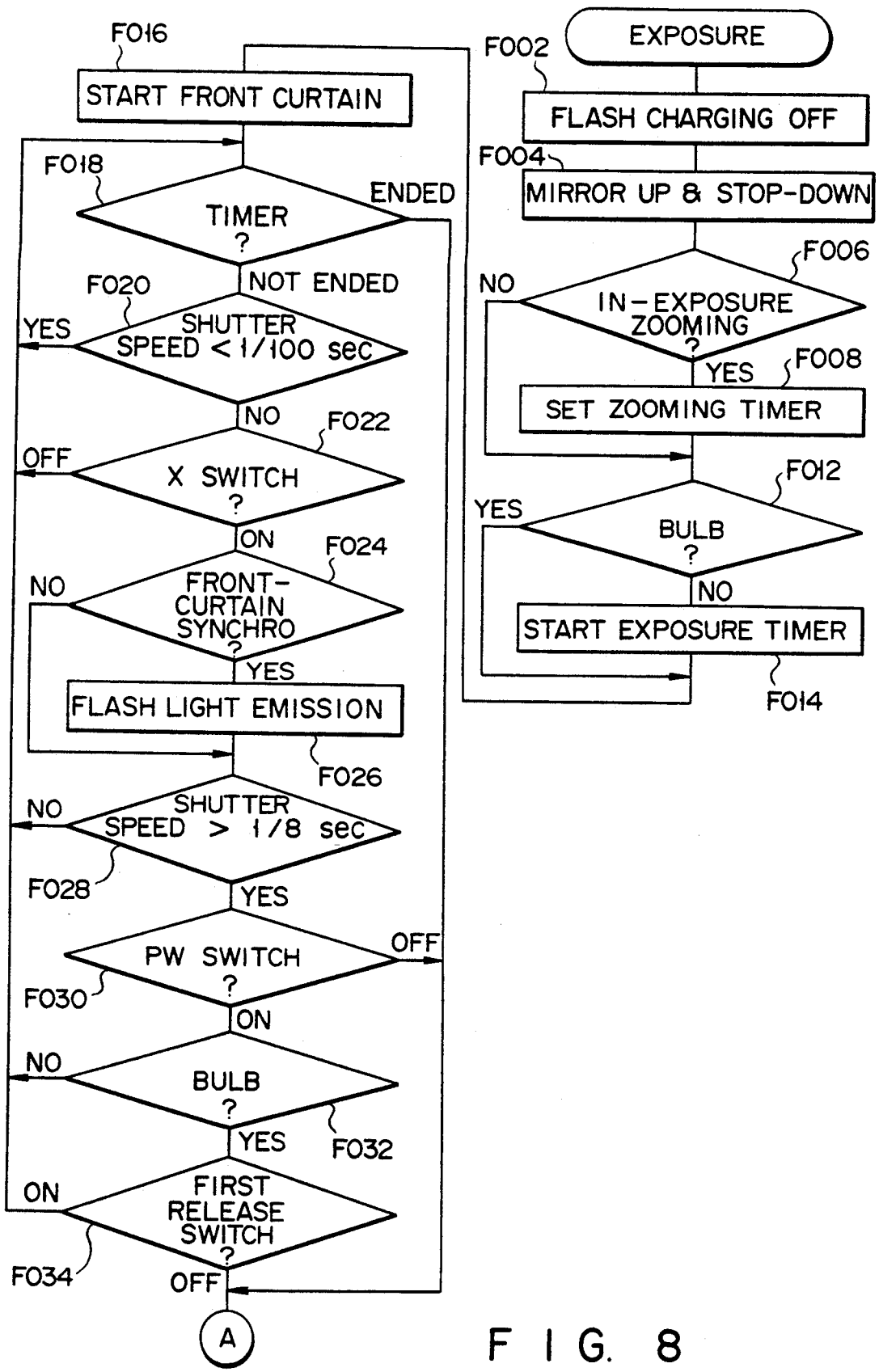
FIG. 8 is a flow chart for explaining some steps of an exposure subroutine shown in FIG. 7.
Figure 9:
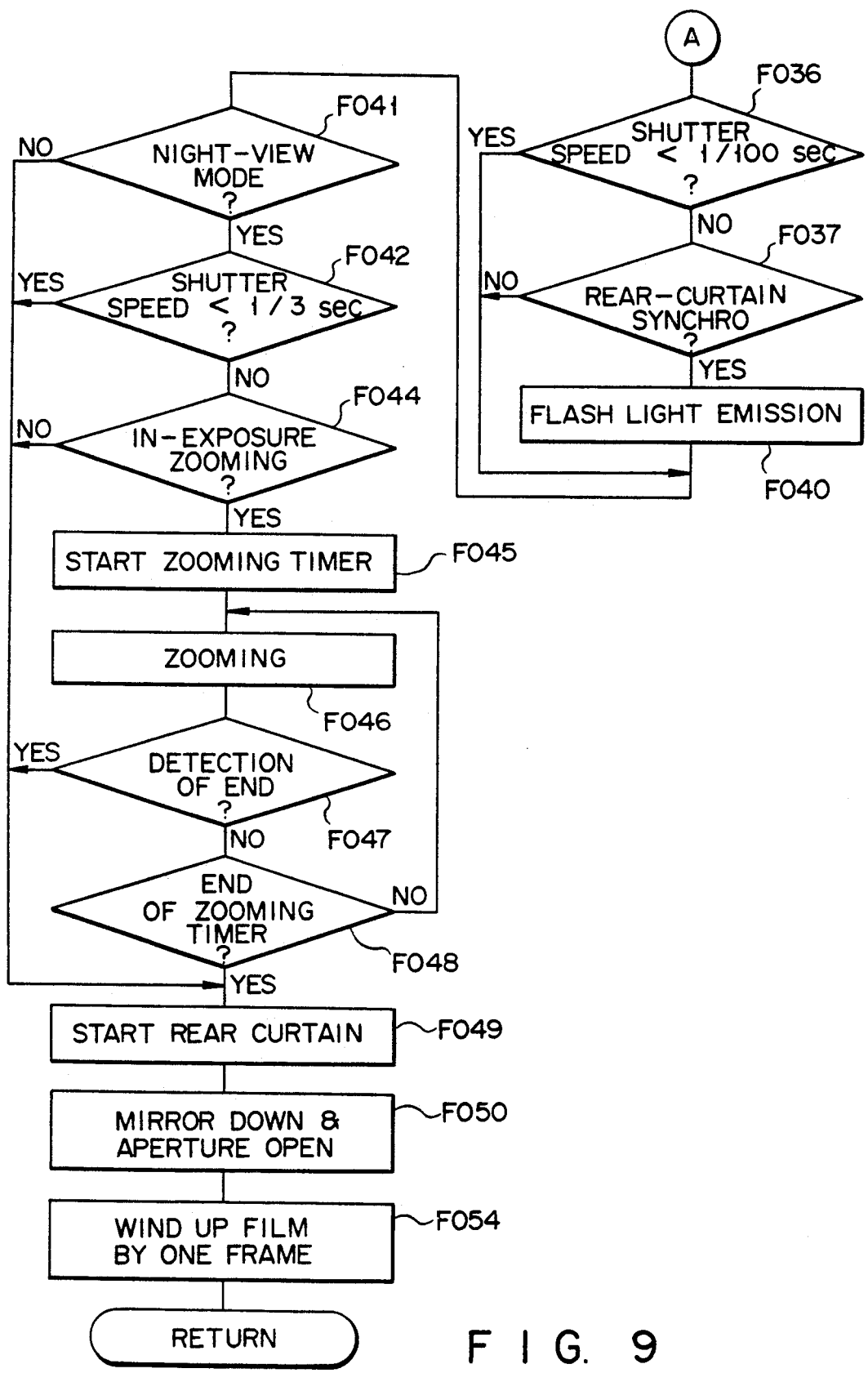
FIG. 9 is a flow chart for explaining the remaining steps of the exposure subroutine shown in FIG. 7.

The exposure subroutine shown in step E056 will be described below. FIGS. 8 and 9 are flow charts showing the exposure subroutine.

In step F002, a charging operation of the flash device is stopped.

In step F004, a mirror-up operation, and a stop-down operation are performed.

In step F006, it is checked if an in-exposure zooming mode is selected. If it is determined that the in-exposure zooming mode is selected, a zooming timer is set in step F008. In the zooming timer, the same value as in an exposure timer is set.

It is checked in step F012 if a photographing mode is a bulb mode. In the bulb photographing mode, an exposure operation is continued while the release switch is depressed, and in this case, the exposure timer is not started.

In step F016 and subsequent steps, exposure processing is executed.

In step F016, the front curtain is started.

Thereafter, an exposure operation is continued while a loop consisting of steps F018 to F034 is repetitively executed. The exposure operation is basically ended when the timer is ended in step F018.

It is checked in step F020 if a shutter speed is lower than 1/100 sec. If it is determined that the shutter speed is lower than 1/100 sec, the flow jumps to step F018. More specifically, when the shutter speed is lower than 1/100 sec, the exposure operation is ended only when the timer is ended in step F018.

It is then checked in step F022 based on the X switch if the drive operation of the front curtain is ended. If it is determined that the drive operation of the front curtain is not ended, the flow jumps to step F018. If it is determined that the drive operation of the front curtain is ended, it is checked in step F024 if a front curtain synchro mode is selected. If it is determined that the front curtain synchro mode is selected, a light emission operation of the flash device is performed in step F026.

It is then checked in step F028 if a shutter speed defines a long exposure time longer than $\frac{1}{8}$ sec. If it is determined that the shutter speed $\leq \frac{1}{8}$ sec, the flow jumps to step F018. On the other hand, if it is determined that the shutter speed $> \frac{1}{8}$ sec, the ON/OFF state of the PW switch 217 is checked in step F030. If it is determined that the PW switch 217 is OFF, the flow jumps to step F036. More specifically, when the shutter speed defines a long exposure time longer than $\frac{1}{8}$ sec, the exposure operation is ended also when the PW switch 217 is turned off.

It is checked in step F032 if the bulb photographing mode is selected. If it is determined that the bulb photographing mode is not selected, the flow jumps to step F018. On the other hand, if it is determined that the bulb photographing mode is selected, the ON/OFF state of the first release switch is checked. If it is determined that the first release switch is ON, the flow jumps to step F108; otherwise, the exposure operation is ended. More specifically, when the bulb photographing mode is selected, the exposure operation can be ended by turning off the first release switch.

When the exposure operation is completed, it is checked again if the shutter speed is shorter than 1/100 sec. If it is determined that the shutter speed is longer than 1/100 sec, it is checked if a rear curtain synchro mode is selected. If it is determined that the rear curtain synchro mode is selected, light-emission control of the flash device is performed in step F040.

If the night-view mode is selected, the shutter speed is longer than $\frac{1}{8}$ sec (step F042), and an in-exposure zooming mode is selected (step F044), the in-exposure zooming operation is executed in step F046. In the in-exposure zooming mode, a zooming is performed during exposure to continuously change the focal length of the lens. In the camera of this embodiment, a zooming operation is performed in a direction indicated by the ZOOM-WIDE switch or the ZOOM-TELE switch before the exposure operation is started until the lens reaches the end portion or until the zooming timer is ended. The direction of the ZOOM switch is stored in the RAM in the main CPU, as described above.

Upon completion of the above-mentioned processing, the rear curtain is moved to end the exposure operation in step F049. In step F050, a mirror-down operation, an aperture opening operation, and the like are performed to prepare for the next exposure operation.

The night-view mode will be explained in more detail below. In this embodiment, the night-view mode has the following features: (1) when a dark scene such as a night view is to be photographed, since a photographing operation is performed after a program exposure level is negatively corrected, a scene can be reproduced as it is seen with the naked eye; (2) the flash slow-synchro mode and the rear-curtain synchro mode are available as synchro photographing modes; (3) since the G number of the flash device is corrected, a photographing mode can be set in correspondence with a dark background; (4) the in-exposure zooming operation can be performed by a simple operation; and (5) an infinity photographing operation can be performed to a far-distance object for which an AF operation is disabled due to a low luminance. In this embodiment, when a photographing operation is performed while selecting the night-view mode, a photograph utilizing these features can be obtained.

The night-view mode is provided in the subject mode, and can be set by depressing the SUBJECT switch several times. When the night-view mode is set, data for displaying a night-view mark as a design of the moon and star on the LCD panel 281 is transmitted to the LCDIC 283. In the night-view mode, a photometric value is corrected by one step to shift a program level. In general, an exposure level of a camera is adjusted with reference to a gray object. For this reason, when a dark scene is photographed with this level, a photograph brighter than a visually observed scene is obtained. In order to eliminate this drawback, the program level is shifted to obtain a photograph closer to a visually observed scene. The emission amount of the flash device is under-corrected by 0.5 step. Thus, a person in a dark background can be prevented from being emphasized in white, and a natural photograph can be obtained.

In a flash photographing mode, the front- and rear-curtain synchro modes are available. In general, in a slow-synchro photographing mode, the rear-curtain synchro photographing mode is preferably employed to obtain a natural photograph. The emission timings in the front- and rear-curtain synchro modes have already been described above with reference to FIG. 9. Since the focal point of the lens of this embodiment is moved by a zooming operation, the flash device emits light before the lens is driven in the rear-curtain synchro mode, thereby avoiding an out-of-focus photograph. Since the AF control of the camera of this embodiment employs a so-called phase difference system, i.e., object light incident through a taking lens is split into two optical paths, and two light components are compared, a distance measurement is often disabled for a low-luminance object. For this reason, a distance measurement for a low-luminance object is performed using AF auxiliary light (auxiliary-light LED 212). However, when an object is present at a far distance like a night view, the effect of the AF auxiliary light cannot be expected. Therefore, in the night-view mode, when a distance measurement is disabled due to a low luminance even when AF auxiliary light is used, it is determined that an object is present at a far distance. Thus, the in-focus flag is forcibly set while setting the focusing lens at the infinity position, thereby allowing exposure.

The in-exposure zooming operation will be explained below. The in-exposure zooming operation is a photographing method of performing a zooming operation during exposure. In a normal in-exposure zooming operation, a principal object is photographed using a flash device, and thereafter, a zooming operation is performed, thus taking a photograph in which the background around the object runs like streams of light. However, a principal object may be located at a far distance beyond a flash light range, or a user may not want to use the flash device. In this case, a coreless photograph may be taken unless a principal object is photographed without using the flash device.

In the camera of this embodiment, the in-exposure zooming operation can be effectively executed without using the flash device. As has been described above with reference to FIG. 9, in the in-exposure zooming operation of this embodiment, a zooming operation is performed after a normal photographing operation including flash light emission is performed. Unlike in the prior art, a predetermined exposure operation is completed before a zooming operation is started, and when the flash rear-curtain synchro mode is selected in the sequence of steps F036 to F048 in FIG. 9, the shutter is closed not immediately after flash light emission but after the zooming is performed. The zooming operation is controlled on the basis of an exposure time, and an output from the zooming encoder, and the zooming lens is driven for a time equal to an exposure time or until it reaches the end portion. With this method, an in-exposure zooming photograph in which a principal object can be clearly printed can be taken regardless of whether or not the flash device is used.

Execution of the in-exposure zooming operation and instruction of the zooming direction are made by the ZOOM-TELE or ZOOM-WIDE switch. The operation procedure is as follows. That is, the release switch is depressed to the first stoke, and when an in-focus state is attained, the zooming direction is determined by the ZOOM-TELE or ZOOM-WIDE switch while the release switch is kept depressed. In this case, the state of the ZOOM-TELE or ZOOM-WIDE switch is stored in the RAM of the main CPU 200. When the release switch is further depressed from this state, exposure is started, and the zooming operation is automatically performed in the stored direction of the ZOOM-TELE or ZOOM-WIDE switch. Therefore, after the exposure is started, the ZOOM-TELE and ZOOM-WIDE switches can be turned off. Although not shown, when the power-focusing mode is selected, the zooming lens is switched to the focusing lens, and the zooming motor is switched to the AF motor, thereby easily selecting an in-exposure defocusing photographing operation by the same operation as in the in-exposure zooming operation.

Figure 10:
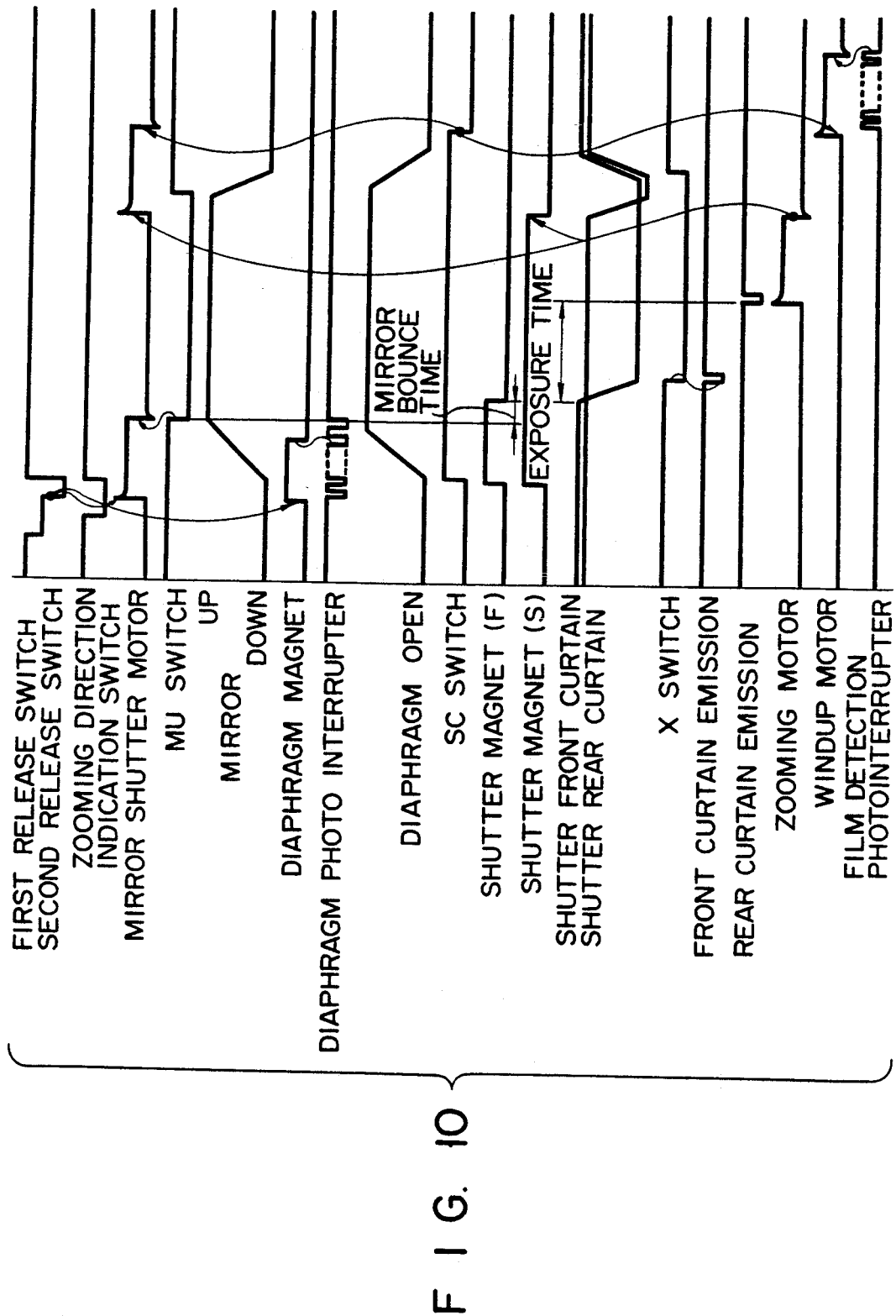
FIG. 10 is a timing chart for explaining in-exposure zooming.

FIG. 10 is a timing chart for explaining the in-exposure zooming operation. When the first-stroke switch (first release switch) of the release switch is turned on, the normal zooming operation is inhibited, and the state of the zooming direction indication switch (ZOOM-TELE or ZOOM-WIDE switch) is stored in the RAM of the main CPU 200. This data is updated once every 100 msec before the release operation is started. Therefore, the zooming direction can be changed before the release operation is started. When the second-stroke switch (second release switch) of the release switch is turned on, the release operation is started. When the release operation is started, the mirror-up and stop-down operations are executed. The mirror-up operation is performed by rotating the mirror-shutter motor in the forward direction while monitoring the MU switch, which is turned on upon completion of the mirror-up operation, by the main CPU 200. On the other hand, the stop-down operation is executed in such a manner that the output from the diaphragm photointerrupter 264 is monitored, and when the lens is stopped down to a target f-number, the magnetic attraction of the diaphragm magnet is released. When the MU switch is turned on, the motor is stopped, and after the control waits for a bounce time of the mirror, the shutter magnet 241 (F) is released. Thereafter, the front curtain of the shutter is started. At the same time, the exposure timer of the main CPU 200 is started. Since the X switch is turned on upon completion of the drive operation of the front curtain, the main CPU 200 outputs a front-curtain synchro emission signal for the flash device in synchronism with this operation. Thereafter, the main CPU 200 monitors the exposure timer, and outputs a flash rear-curtain synchro emission signal for the flash device after an elapse of the exposure time. When no in-exposure zooming operation is performed, the shutter magnet 241 (S) is released in this state, and the rear curtain of the shutter is started. However, when the in-exposure zooming operation is performed, the exposure timer is restarted. Thereafter, the exposure timer is used as a zooming timer. Simultaneously with the start of the timer, rotation of the zooming motor is started to perform a zooming operation in the stored direction. The zooming operation is continued until the timer overflows or until it is determined based on the output from the zooming encoder that the zooming lens has reached the TELE or WIDE end. When the zooming operation is completed, the rear curtain is started, thus ending exposure. After the exposure is ended, the mirror-down operation is performed, and a film is then wound up by one frame.

When the in-exposure zooming operation is performed in this manner, an in-exposure zooming photograph in which a principal object can be clearly printed can be taken regardless of whether or not the flash device is used.

As described above, according to the camera having the in-exposure zooming apparatus of the present invention, when the flash device is used, a photograph can be easily and appropriately taken by the in-exposure zooming operation.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A camera having an in-exposure zooming mechanism for performing a zooming operation, said camera, comprising:
   a zoom lens barrel capable of varying a focal length of a taking lens;
   a motor for changing the focal length of said taking lens;
   luminance measurement means for measuring a luminance of an object;
   mode setting means for setting an in-exposure zooming mode;
   shutter speed calculation means for, when the in-exposure zooming mode is selected by said mode setting means, calculating a shutter speed suitable for the in-exposure zooming mode on the basis of an output from said luminance measurement means;
   shutter release means for executing a shutter opening operation in accordance with an operation of a shutter release button, a time period corresponding to said shutter speed being started upon execution of said shutter opening operation;
   counter means for outputting a timing signal when said time period has elapsed;
   judgment means for, when the timing signal is output from said counter means, judging whether or not the in-exposure zooming mode is set by said mode setting means;
   drive control means for, when said judgment means determines that the in-exposure zooming mode is set by said mode setting means, driving said motor to change the focal length of said taking lens; and
   shutter closing means for executing a shutter closing operation upon completion of the zooming operation.

2. A camera according to claim 1, wherein said shutter speed calculation means comprises means for calculating, on the basis of a film sensitivity and the luminance measured by said luminance measurement means, a shutter speed which provides a predetermined underexposure amount as compared to a shutter speed corresponding to a proper exposure amount.

3. A camera according to claim 1, wherein:
   said mode setting means comprises means for setting a focal length direction of an in-exposure zooming operation, and
   said drive control means comprises means for controlling a drive operation of said taking lens to attain the focal length direction set by said mode setting means.

4. A camera according to claim 1, wherein said judgment means comprises means for, when the in-exposure zooming mode is set and when the shutter speed is shorter than a predetermined speed, causing said drive control means to inhibit a motor drive operation of the in-exposure zooming operation.

5. A camera according to claim 1, further comprising a flash device and means for, when said flash device is to emit light, performing a light-emission operation when a closing signal is output from said counter means.

6. A camera according to claim 1, further comprising means for detecting completion of said zooming operation when said taking lens reaches one of two ends of a defined focal length change region.

7. A camera according to claim 1, further comprising means for detecting completion of said zooming operation when a time period equal to a time between a shutter release timing and a zooming operation start timing elapses after the zooming operation is started.

8. A camera according to claim 1, wherein a drive speed of said motor for charging the focal length of said taking lens is constant regardless of the shutter speed.

9. A camera having an in-exposure zooming mechanism for performing a zooming operation, said camera comprising:
   a zooming lens barrel for varying a focal length of a taking lens by a drive operation of a motor;
   shutter speed value determination means for setting or calculating a shutter speed;
   mode setting means for setting an in-exposure zooming mode;
   shutter release means for executing a shutter opening operation in accordance with an operation of a shutter release button, a time period corresponding to said shutter speed being started upon execution of said shutter opening operation;
   signal output means for outputting a timing signal after said time period has elapsed;
   judgment means for, when the timing signal is output, judging whether or not the in-exposure zooming mode is set;
   first control means for, when said judgment means determines that the in-exposure zooming mode is set, driving said motor to change the focal length of said taking lens, and for executing a shutter closing operation after the in-exposure zooming operation is ended; and
   second control means for, when said judgment means determines that the in-exposure zooming mode is not set, immediately executing the shutter closing operation.

10. A motorized zooming camera for performing a zooming drive operation of a zooming lens during film exposure, comprising:
    start timing calculation means for calculating, in accordance with a luminance of an object, a start timing of the zooming drive operation after an exposure operation is started;

output means for outputting a zooming start signal when the timing calculated by said start timing calculation means is reached after the exposure operation is started; and zooming lens drive means for zooming said zooming lens in response to the zooming start signal.

11. A camera according to claim 10, wherein said start timing calculation means comprises means for calculating, as the start timing, a timing corresponding to a shutter speed which provides a predetermined under-exposure amount as compared to a shutter speed obtained based on an object luminance value and corresponding to a proper exposure amount.

12. A motorized zooming camera comprising:

mode setting means for setting an in-exposure zooming mode for performing a zooming operation during film exposure;

start timing calculation means for calculating, in accordance with a luminance of an object, a start timing of the zooming operation after an exposure operation is started;

output means for outputting a zooming start signal when the timing calculated by said start timing calculation means is reached after the exposure operation is started; and zooming lens drive means for zooming said zooming lens in response to the zooming start signal, said camera further comprising:

inhibit means for, when the start timing of the zooming operation is earlier than a predetermined timing, inhibiting said output means from outputting the zooming start signal even when the in-exposure zooming mode is set.

13. A camera according to claim 12, wherein said start timing calculation means comprises means for calculating, as the start timing, a timing corresponding to a shutter speed which provides a predetermined under-exposure amount as compared to a shutter speed obtained based on an object luminance value and corresponding to a proper exposure amount.

14. A camera having an intra-zooming apparatus for outputting an emission command to a flash device in response to a shutter closing operation, comprising:

a zooming lens barrel for varying a focal length of a taking lens by a drive operation of a motor;

shutter speed value determination means for setting or calculating a shutter speed;

mode setting means for setting an in-exposure zooming mode;

shutter release means for executing a shutter opening operation in accordance with an operation of a shutter release button, a time period corresponding to said shutter speed being started upon execution of said shutter opening operation;

signal output means for outputting a timing signal after said time period has elapsed;

judgment means for, when the timing signal is output, judging whether or not the in-exposure zooming mode is set;

flash emission timing signal output means for, when said judgment means determines that the in-exposure zooming mode is set, changing an output timing of the emission command to said flash device so that the emission command is output responsive to the output of the timing signal, but not responsive to the shutter closing operation;

drive control means for driving said motor to change the focal length of said taking lens; and shutter closing means for executing the shutter closing operation after said motor is driven.

15. A camera according to claim 14, wherein said shutter speed calculation means comprises means for calculating, on the basis of a measured luminance and a film sensitivity, a shutter speed which provides a predetermined under-exposure amount as compared to a shutter speed corresponding to a proper exposure amount.

16. A camera according to claim 14, wherein:

said mode setting means comprises means for setting a focal length direction of an in-exposure zooming operation, and said drive control means comprises means for controlling a drive operation of said taking lens to attain the focal length direction set by said mode setting means.

17. A camera according to claim 14, wherein said judgment means comprises means for, only when the in-exposure zooming mode is set and when the shutter speed is slower than a predetermined speed, causing said drive control means to drive said motor for the in-exposure zooming operation.

18. A camera having an in-exposure zooming mechanism which performs an in-exposure zooming operation for varying a focal length of a taking lens during exposure of a film; comprising:

in-exposure zooming operation means, including a zooming lens barrel and a motor, for varying a focal length of a taking lens during exposure of the film, by means of a drive operation of said motor;

mode setting means for setting an in-exposure zooming mode for carrying out a zooming operation to vary the focal length of the taking lens during exposure of the film; and signal output means for, when the in-exposure zooming mode is set, outputting an emission start signal to a flash device at the beginning of said in-exposure zooming operation after exposure is performed at a given focal length for a predetermined period of time.

19. A camera having an in-exposure zooming mechanism which performs an in-exposure zooming operation for varying a focal length of a taking lens during exposure of a film, comprising:

in-exposure zooming operation means, including a zooming lens barrel and a motor, for varying a focal length of a taking lens by a drive operation of a motor;

zooming direction indication means for indicating a change direction of the focal length of said zooming lens barrel driven by said motor;

mode setting means for setting a given mode in which the zooming lens is driven for zooming;

storage means for storing the change direction of the focal length indicated by said zooming direction indication means in a state wherein the given mode is set and wherein an operation member is operated;

judgment means for, when the given mode is set and the change direction of the focal length is stored in said storage means, determining that an in-exposure zooming mode is set; and drive control means for, when said judgment means determines that the in-exposure zooming mode is set, driving said motor to change the set focal length of said taking lens in the indicated change direction during exposure of the film.

20. A camera according to claim 19, wherein the given mode is a night-view mode suitable for performing a photographing operation in a dark environment.

21. A camera according to claim 19, wherein said operation member comprises a first release switch.

22. A camera according to claim 19, further comprising:
shutter speed value determination means for determining a shutter speed;
signal output means for outputting a timing signal when a time period corresponding to the shutter speed has elapsed;
shutter release means for executing a shutter opening operation in accordance with an operation of a shutter release button; and
determination means for, when the timing signal is output, determining whether or not the in-exposure zooming mode is set;
wherein the in-exposure zooming operation is started after the elapse of said time period.

23. A camera according to claim 19, further comprising a flash device and means for, when said flash device is to emit light, performing a light-emission operation when the in-exposure zooming operation is started.

24. A camera having an in-exposure zooming mechanism, comprising:
a zooming lens barrel for varying a focal length of a taking lens by a drive operation of a motor;
zooming direction indication means for indicating a change direction of the focal length of said zooming lens barrel driven by said motor;
storage means for storing the change direction of the focal length indicated by said zooming direction indication means in a state wherein a specific mode is set; and
drive control means for, when the specific mode is set and the change direction of the focal length is stored in said storage means, driving said motor to change the focal length in the indicated change direction during exposure.

25. A motorized zooming camera for performing a zooming drive operation of a zooming lens during film exposure, comprising;
a motor for performing the zooming drive operation of said zooming lens;
zooming direction setting means for setting a zooming drive direction during the exposure;
start timing calculation means for calculating, in accordance with a luminance of an object, a start timing of the zooming drive operation after an exposure operation is started;
output means for outputting a zooming start signal when the start timing calculated by said start timing calculation means is reached after the exposure operation is started; and
motor drive means for outputting a drive signal to said motor in accordance with an output from said zooming direction setting means responsive to the zooming start signal.

26. A camera according to claim 25, wherein said start timing calculation means comprises means for calculating, as the start timing, a timing corresponding to a shutter speed which provides a predetermined under-exposure amount as compared to a shutter speed obtained based on an object luminance value and corresponding to a proper exposure amount.

27. A camera according to claim 25, wherein said zooming direction setting means includes an operation member for indicating the zooming drive direction of said zooming lens before the exposure operation is started.

28. A camera having an in-exposure zooming mechanism which performs an in-exposure zooming operation for varying a focal length of a taking lens during exposure of a film, comprising:
a zooming lens barrel for varying a focal length of a taking lens during an in-exposure zooming operation by means of a drive operation of a motor;
mode setting means for setting an in-exposure zooming mode in which the taking lens is driven for zooming;
a zooming direction indication member for indicating a change direction of the focal length in the in-exposure zooming mode;
storage means for storing the change direction of the focal length indicated by said zooming direction indication member; and
drive control means for driving said motor from the set focal length of said zooming lens in the change direction of the focal length stored in said storage means during exposure of the film.

29. A camera system having an in-exposure zooming mode in which a zoom lens is driven so as to be zoomed during exposure of a film, said system comprising:
shutter speed determining means for determining a shutter speed;
start time determining means for determining, in accordance with an output from said shutter speed determining means a time to start driving the zoom lens so as to be zoomed during exposure of the film;
output means for outputting a zooming start signal at the time determined by said start timing determining means, after exposure of the film begins; and
zoom lens driving means, responsive to the zooming start signal output from said output means for driving the zoom lens so as to be zoomed;
wherein the start time determined by said start time determining means corresponds to a shutter speed which is a predetermined value less than the shutter speed determined by said shutter speed determining means.

30. A camera system having an in-exposure zooming mode in which a zoom lens is driven so as to be zoomed during exposure of a film, said camera system comprising:
shutter speed determining means for determining a shutter speed of a shutter of the camera system;
shutter controlling means for controlling opening and closing of the shutter in accordance with an output from said shutter speed determining means; and
lens driving means for driving the zoom lens so as to be zoomed during only the latter half of a control operation by said shutter controlling means;
wherein said lens driving means drives the zoom lens at a predetermined speed, irrespective of the output from said shutter speed determining means.

31. A camera system having a zooming mode in which a zoom lens is driven so as to be zoomed during exposure of a film, said system comprising:
a zoom lens, a focal distance of which is adjustable;
shutter speed determining means for determining a shutter speed;
start time determining means for determining, in accordance with an output rom said shutter speed determining means, a time to start driving the zoom lens so as to be zoomed during exposure of the film;

output means for outputting a zooming start signal at the time determined by said start time determining means, after exposure of the film begins; and zoom lens driving means responsive to the zooming start signal output from said output means, for driving the zoom lens so that it is zoomed from a current focal distance.

32. A camera having an in-exposure zooming mechanism, comprising:

a zooming lens barrel for varying a focal length of a taking lens by a drive operation of a motor;

zooming direction indication means for indicating a change direction of the focal length of said zooming lens barrel driven by said motor;

mode setting means for setting a night-view mode in which the zooming lens is driven for zooming, the night-view mode being suitable for performing a photographing operation in a dark environment;

storage means for storing the change direction of the focal length indicated by said zooming direction indication means in a state wherein the night-view mode is set and wherein an operation member is operated;

judgment means for, when the night-view mode is set and the change direction of the focal length is stored in said storage means, determining that an in-exposure zooming mode is set; and drive control means for, when said judgment means determines that the in-exposure zooming mode is set, driving said motor to change the set focal length of said taking lens in the indicated change direction.

* * * * *